United States Patent
Labonté et al.

(10) Patent No.: US 6,871,424 B2
(45) Date of Patent: Mar. 29, 2005

(54) SKATE BOOT

(75) Inventors: Ivan Labonté, Montreal (CA); Chris Langevin, Prévost (CA)

(73) Assignee: Bauer Nike Hockey Inc., St-Jérôme (CA)

( * ) Notice: Subject to any disclaimer, the term of this patent is extended or adjusted under 35 U.S.C. 154(b) by 82 days.

(21) Appl. No.: 10/202,868

(22) Filed: Jul. 26, 2002

(65) Prior Publication Data

US 2004/0016150 A1 Jan. 29, 2004

(51) Int. Cl.$^7$ ............ A43B 5/00; A43B 23/00
(52) U.S. Cl. ............ 36/115; 36/88; 36/45; 36/87; 36/89; 36/93
(58) Field of Search ............ 36/88, 89, 92, 36/93, 45, 87, 117.1, 115

(56) References Cited

U.S. PATENT DOCUMENTS

| | | | |
|---|---|---|---|
| 3,076,274 A | 2/1963 | Schlecht | |
| 3,659,361 A | 5/1972 | White, Sr. | |
| 4,126,323 A | 11/1978 | Scherz | |
| 4,194,308 A | 3/1980 | Karlsson | |
| 4,343,097 A | 8/1982 | Sasaki | |
| 4,351,537 A | * 9/1982 | Seidel | 280/11.12 |
| 4,353,173 A | * 10/1982 | Paquet | 36/44 |
| 4,384,413 A | 5/1983 | Bourque | |
| 4,385,456 A | 5/1983 | Livernois et al. | |
| 4,433,494 A | 2/1984 | Courvoisier et al. | |
| 4,505,056 A | 3/1985 | Benéteau | |
| 4,509,276 A | 4/1985 | Bourque | |
| 4,835,885 A | 6/1989 | Hoshizaki et al. | |
| 5,339,544 A | 8/1994 | Caberlotto | |
| 5,342,070 A | 8/1994 | Miller et al. | |
| 5,778,566 A | 7/1998 | Edauw et al. | |
| 5,785,909 A | 7/1998 | Chang et al. | |
| 5,885,500 A | 3/1999 | Tawney et al. | |
| 5,896,683 A | * 4/1999 | Foxen et al. | 36/89 |
| 6,079,128 A | 6/2000 | Hoshizaki et al. | |
| 6,102,412 A | 8/2000 | Staffaroni | |
| 6,112,434 A | 9/2000 | Seltzer et al. | |
| 6,233,848 B1 | * 5/2001 | Bonaventure | 36/89 |
| 6,260,290 B1 | 7/2001 | Chenevert | |
| 6,295,679 B1 | 10/2001 | Chenevert | |
| 6,457,265 B1 | * 10/2002 | Lepage et al. | 36/117.1 |
| 6,499,233 B1 | * 12/2002 | Chenevert | 36/55 |
| 6,558,784 B1 | 5/2003 | Norton et al. | |
| 6,670,029 B2 | 12/2003 | Norton et al. | |
| 2001/0003876 A1 | * 6/2001 | Racine | 36/115 |
| 2001/0042324 A1 | * 11/2001 | Filice | 36/115 |
| 2002/0071946 A1 | 6/2002 | Norton et al. | |

FOREIGN PATENT DOCUMENTS

| | | |
|---|---|---|
| CA | 2112272 | 6/1995 |
| CA | 2328569 A1 | 10/2001 |
| DE | 617364 | 7/1935 |
| EP | 1 016 353 A2 | 7/2000 |
| EP | 1021964 * | 7/2000 |
| GB | 1.141.836 | 2/1969 |
| WO | WO 90/03744 | 4/1990 |

* cited by examiner

*Primary Examiner*—Marie Patterson

(57) ABSTRACT

A lasted skate boot for ice skates or in-line roller skates, the lasted skate boot comprising an upper having an outer shell molded of synthetic material and an inner lining mounted inside the outer shell. The outer shell comprises a heel counter, an ankle portion, medial and lateral quarters and reinforcing elements provided on the heel counter, ankle portion, medial quarter or lateral quarter. Each of the reinforcing elements comprises a ridge formed on one of the inner or outer surface of the outer shell and a groove registering with the ridge, the groove being formed on one of the inner or outer surface of the outer shell. The outer shell may also comprise an ankle portion having an upper part and a lower part that projects outwardly with relation to the upper part, the lower part merging with the heel counter. The lower and upper parts of the ankle portion follow the rear profile of the Achilles tendon.

59 Claims, 12 Drawing Sheets

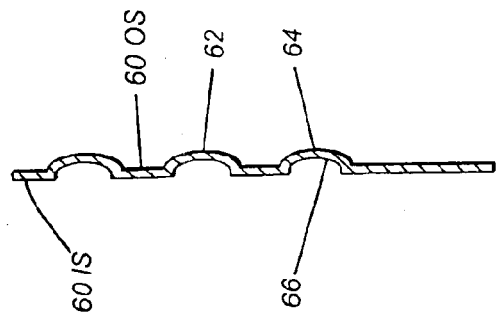
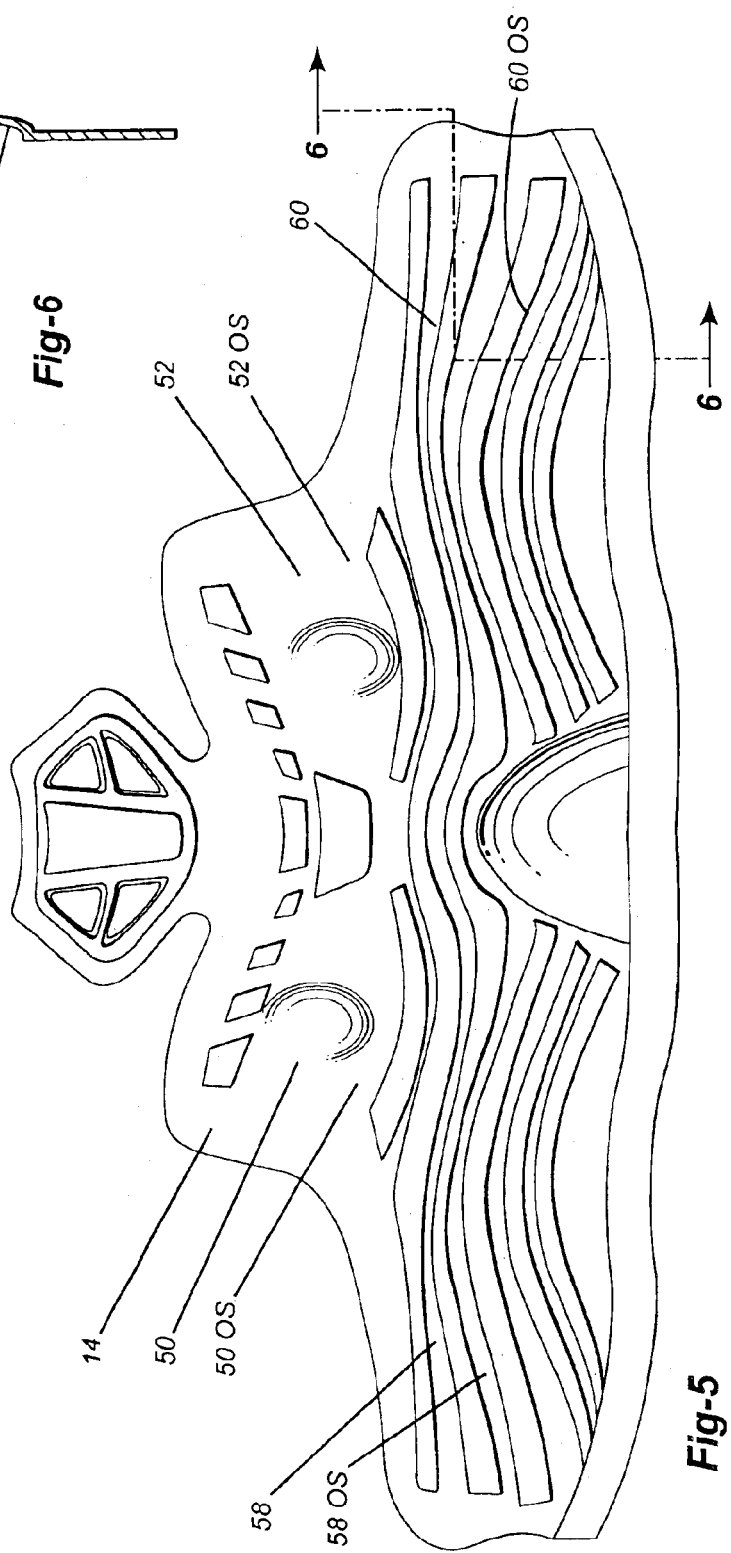

SKATE BOOT

FIELD OF THE INVENTION

The invention relates to a lasted skate boot for ice skates or in-line roller skates and more particularly to a lasted skate boot comprising an upper having a molded outer shell and an inner lining mounted inside the outer shell.

BACKGROUND OF THE INVENTION

Typical skate boots are fabricated by assembling together previously die-cut pieces of textile material and shaping them over a last. Various pieces of textiles or fabrics are cut to specific patterns, which are then pre-assembled by stitching or gluing or both into a multi-layer construction. The rigidity and flexibility characteristics of the skate boot are defined by the various layers of materials being positioned and layered in specific regions of the pre-assembled component of the skate boot. The accumulation of pieces of material into layers and the mechanical properties of each piece of textile or fabric material define the overall dynamic behavior of the skate boot. Usually, the pre-assembled component further includes rigid components generally made of plastic to increase the rigidity of specific area of the skate boot. The pre-assembled boot generally consists of the back and sides of the skate boot and a toe cap and tongue assembly. The pre-assembled boot has the general configuration of the finished product but has not yet been shaped to the final form of the skate boot.

The pre-assembled component is positioned over a last and formed to obtain the shape of the desired finished product. A last is a three-dimensional shape of the inside cavity of a boot. The pre-assembled boot may be mounted upside down onto the last for ease of manipulation and assembly of the remaining components making up the skate boot.

An insole is placed on the top part of the upside down last and the pre-assembled boot is stretched over the last and over the insole in order for the pre-assembled boot to conform to the specific shape of the last. The stretched material is then glued and nailed or tacked to the insole to maintain the desired shape.

Once the upper part of the skate boot is completed, a rigid outsole is secured to the insole of the boot to complete the skate boot. An ice skate blade holder or an in-line roller chassis is finally mounted to the bottom of the boot to complete the skate.

This type of process is extensively used in the shoemaking industry. It generates a good product but has some disadvantages. For instance, the number of parts involved in the multi-layer construction can be staggering; a conventional ice skate for hockey may have up to eighty parts to be assembled and shaped over the last. As a consequence, the manufacturing process is lengthy and complex.

There is a need in the industry for a skate boot made of fewer components than the traditionally made skate boot and which is lighter than the traditionally made skate boot.

There is also a need for a skate boot, which provides flexibility and durability as well as optimal performance.

SUMMARY OF THE INVENTION

As embodied and broadly described herein, the invention seeks to provide a lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes; (a) said upper comprising an outer shell and an inner lining mounted inside said outer shell; (b) said inner lining comprising a surface facing the heel, the ankle and the medial and lateral sides of the foot, said inner lining is less rigid than said outer shell; and (c) said outer shell being molded of synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, said medial and lateral quarters having an inner surface and an outer surface, at least one of said medial and lateral quarters comprising reinforcing elements, each of said reinforcing elements having a ridge formed on one of said inner or outer surfaces and a groove registering with said ridge, said groove being formed on one of said inner or outer surfaces.

As embodied and broadly described herein, the invention also seeks to provide a lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes; (a) said upper comprising an outer shell and an inner lining mounted inside said outer shell; (b) said inner lining comprising a surface facing the heel, the ankle and the medial and lateral sides of the foot, said inner lining is less rigid than said outer shell; and (c) said outer shell being molded of synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprises an upper part and a lower part that projects outwardly with relation to said upper part, said lower part merging with said heel counter, said upper part following the upper part of the Achilles tendon and said lower part following the lower part of the Achilles tendon.

As embodied and broadly described herein, the invention also seeks to provide a molded outer shell for use in an upper of a lasted skate boot having a sole component, said molded outer shell comprising a heel counter receiving the heel of a human foot, an ankle portion receiving the ankle and medial and lateral quarters receiving the medial and lateral sides of the foot respectively, said medial and lateral quarters extending forwardly from said heel counter and said ankle portion, said medial and lateral quarters having an inner surface and an outer surface, at least one of said medial and lateral quarters comprising reinforcing elements, each of said reinforcing elements having a ridge formed on one of said inner or outer surfaces and a groove registering with said ridge, said groove being formed on one of said inner or outer surfaces.

As embodied and broadly described herein, the invention also seeks to provided a molded outer shell for use in an upper of a lasted skate boot having a sole component, said molded outer shell comprising a heel counter receiving the heel of a human foot, an ankle portion receiving the ankle and medial and lateral quarters receiving the medial and lateral sides of the foot respectively, said ankle portion comprising an upper part and a lower part that projects outwardly with relation to said upper part, said lower part merging with said heel counter, said upper part following the upper part of the Achilles tendon of the foot and said lower part following the lower part of the Achilles tendon of the foot.

Advantageously, the ankle portion of the outer shell comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge, said groove being formed on one of said inner or outer surfaces. The ankle portion may also comprise a lateral depression for receiving the lateral malleolus and a medial depression for receiving the medial malleolus, the lateral depression being below the medial depression. The heel counter may also comprise reinforcing elements having a ridge and a groove registering with the ridge.

Other objects and features of the invention will become apparent by reference to the following description and the drawings.

BRIEF DESCRIPTION OF THE DRAWINGS

A detailed description of the preferred embodiments of the present invention is provided herein below, by way of example only, with reference to the accompanying drawings, in which:

FIG. 5 is a rear elevational view of the outer shell shown in an unfolded position;

FIG. 6 is a cross-sectional view of the outer shell taken at line 6—6 of FIG. 5;

Figure 1:
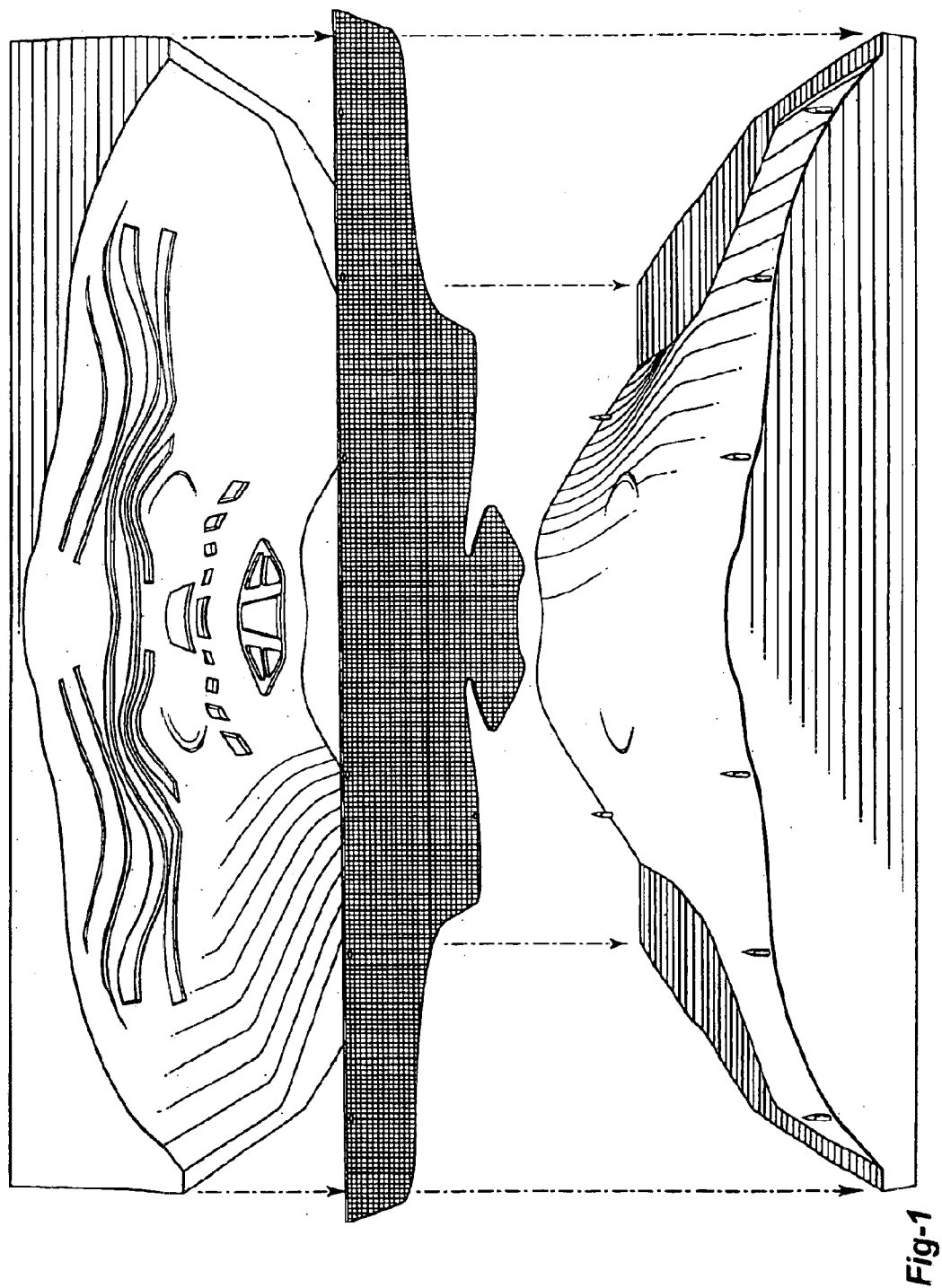
FIG. 1 is a perspective view illustrating a male-female mold for forming an outer shell according to the invention.

In the drawings, preferred embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF PREFERRED EMBODIMENTS

Figure 13:
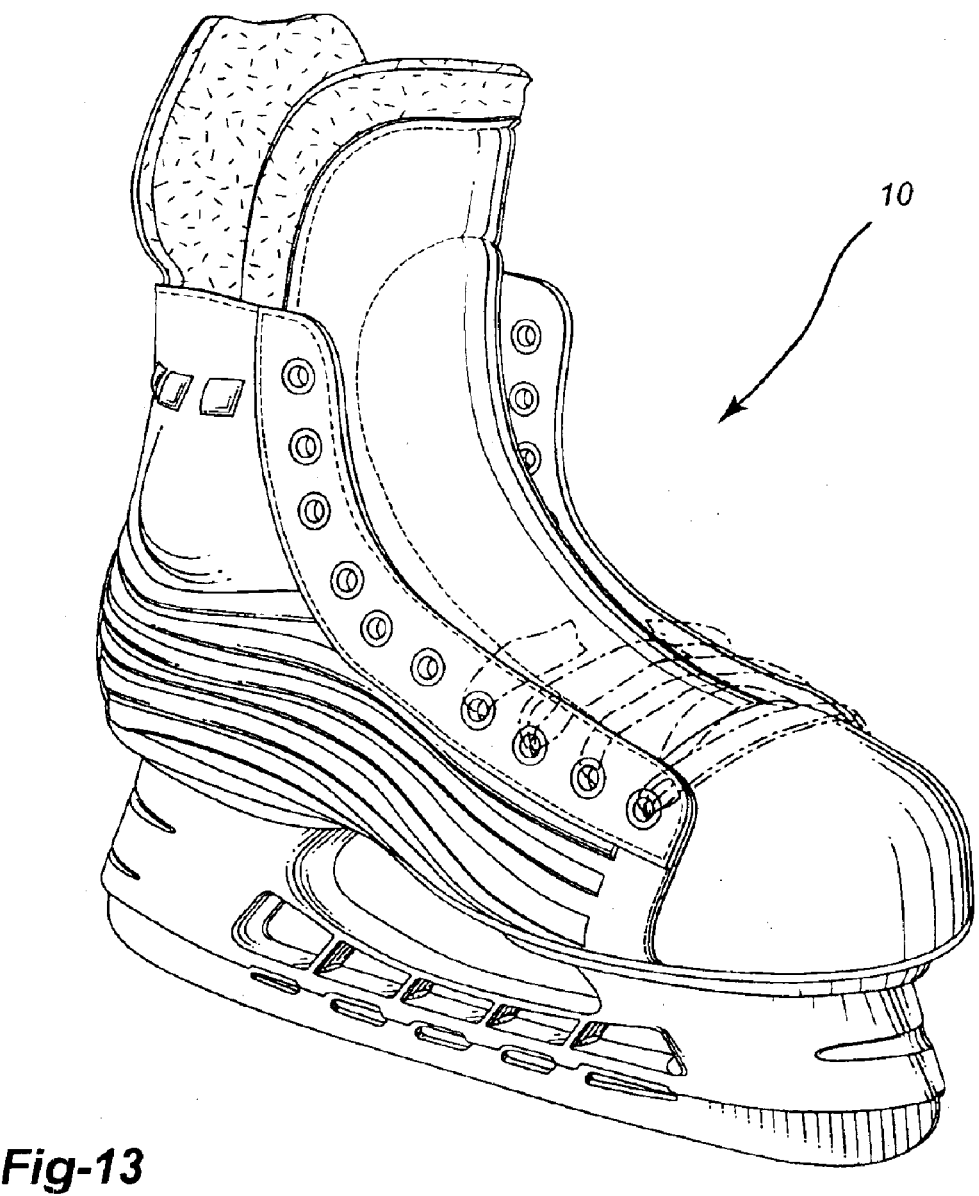
FIG. 13 is a perspective view of an ice skate incorporating the skate boot constructed in accordance with the invention.

A skate boot manufactured in accordance with the present invention is illustrated generally by reference numeral 10 in FIG. 13.

Figure 11:
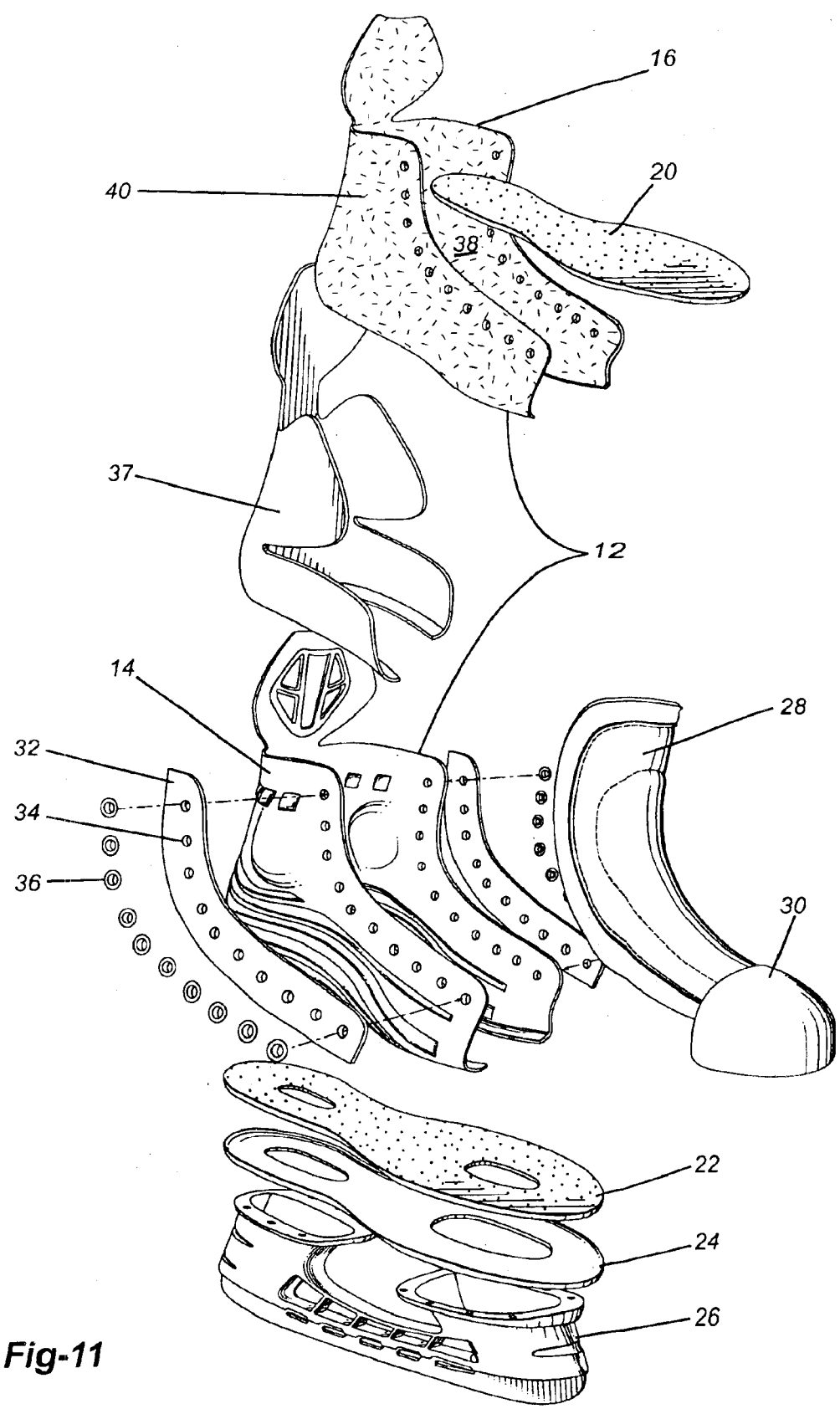
FIG. 11 is an exploded perspective view illustrating an ice skate incorporating the outer shell constructed in accordance with the invention.

Referring to FIG. 11, skate boot 10 comprises an upper 12 for enclosing a human foot. Upper 12 comprises an outer shell 14 and an inner lining 16 mounted inside outer shell 14. Outer shell 14 illustrated in FIGS. 5 to 11 is for use in a skate boot for a right foot.

Outer shell 14 is molded of synthetic material. More particularly, outer shell 14 is made by thermo-pressured molding of a suitable thermoforming material initially in uniform thickness sheet form such as a pre-cut sheet having a desired contour, the sheet being made of thermoforming materials such as those sold under the trade-mark MEGA-BIX® (a core of extruded SURLYN®, a backing of SONTARA® and a hot melt coating; thickness of 0.95 mm), FORMO500® (non woven polyester with a core of extruded polyolefinic, stiffening layers of synthetic latex on each side and an ethylene vinyl acetate hot melt adhesive on one side; thickness of 1.50 mm), BYLON® (a nylon multifilament with a backing of black saturated needle punched polyester nonwoven and a face coating of non-fray urethane) and MOSOCA® (NYLON® 66 with a core of SURLYN® and a PU coating).

Outer shell 14 can be made of a homogenous thermoforming synthetic material or can be made of layers of different thermoforming synthetic materials. For example, outer shell 14 may comprise two layers, the material of the outer layer of shell 14 being more rigid, or more resistant to abrasion, than the material of the inner layer of shell 14. More specifically, outer layer of shell 14 can be made of a pre-cut sheet of MOSOCA® and inner layer of shell 14 can be made of a pre-cut sheet of polystyrene, both sheets being molded together. A pre-cut sheet of polyethylene or polyurethane may also be used for inner layer of shell 14. The outer and inner layers may be stitched together before or after the molding operation if desired.

Inner lining 16 is made of a soft material and has an inner surface 38 and an outer surface 40. Inner lining can be a fabric made of 100% nylon fibers. Inner surface 38 is intended to contact the skin of the foot in use. Outer surface 40 of inner lining 16 is secured to outer shell 14 by affixing means such as glue, stitches, nails, adhesives or tacks. It is understood that inner lining 16, being made of a soft material, is less rigid than outer shell 14 that is molded of synthetic material being sufficiently rigid for supporting the foot.

Skate boot 10 also includes a footbed 20, an insole 22 facing the plantar surface of the foot and an outsole 24 secured to insole 22. Insole 22 is secured to outer shell 14 with a fastener such as stitches, glue, nails, adhesives or tacks. An ice skate blade holder 26 is secured to outsole 24. It is understood that an in-line roller chassis may also be secured to outsole 24. Insole 22 and outsole 24 have apertures for allowing access to a locking mechanism of the ice skate blade with ice skate blade holder 26 (not illustrated).

Skate boot 10 also comprises a tongue 28 and a toe box 30 facing the toes of the foot. Tongue 28 extends upwardly and rearwardly from toe box 30 and covers the upper front portions of the foot and the ankle. Preferably, toe box 30 and tongue 28 are pre-assembled prior to installing into outer shell 14. The frontal edge of tongue 28 is sewn directly to toe box 30, and then both sides of toe box 30 are secured to outer shell 14 with a fastener such as stitches, glue, nails, adhesives or tacks. Toe box 30 may also be glued, nailed or tacked to outer shell 14.

Skate boot 10 also comprises a band 32 secured to an upper portion of outer shell 14, band 32 being made of fabric, textile or leather and comprising apertures 34. Eyelets 36 are punched into band 32, outer shell 14 and inner lining 16 vis-a-vis apertures 34. It is understood that the skate boot may comprise lacing loops and/or eyelets 36. Skate boot 10 may comprise a rigid insert 37 that provides more rigidity in the ankle and heel portions of skate boot 10 and which is sandwiched between outer shell 14 and inner lining 16. Skate boot 10 may also comprise a protective overlay recovering a portion of upper 12 or a rear cover 39 secured to a rear portion of outer shell 14 (see FIG. 12). Protective overlay and rear cover 39 may be made of fabric, textile or leather.

Figure 14:
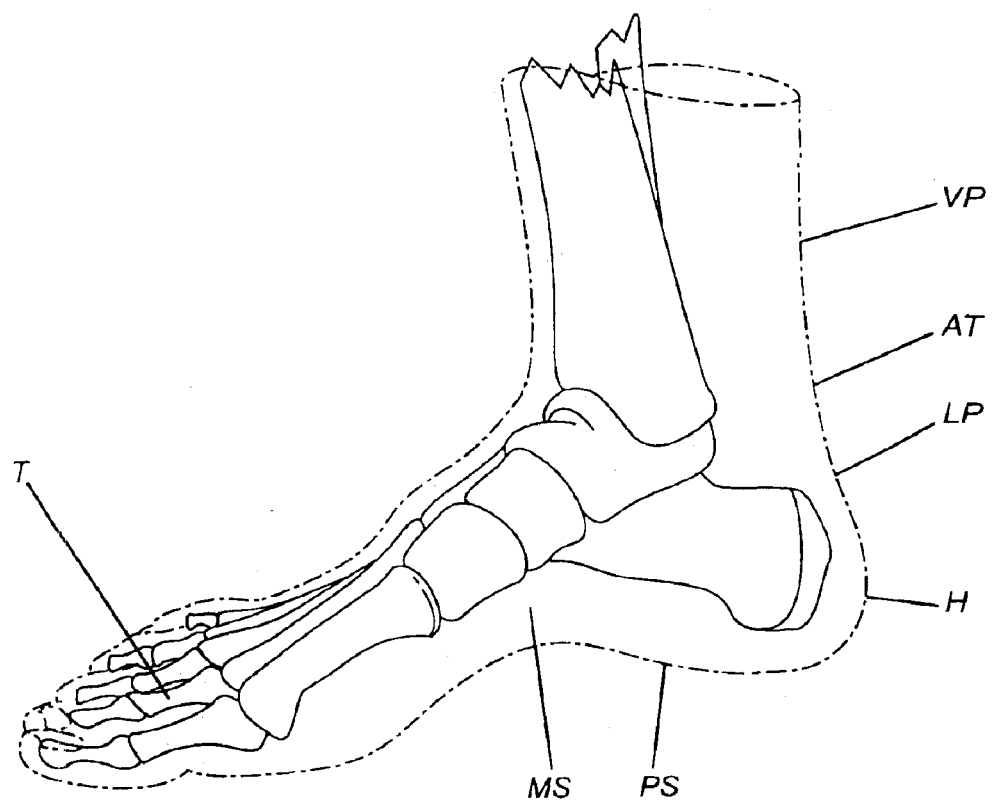
FIG. 14 is a perspective view of a human foot with the contour of the foot in stippled lines and the bones in plain lines.
Figure 15:
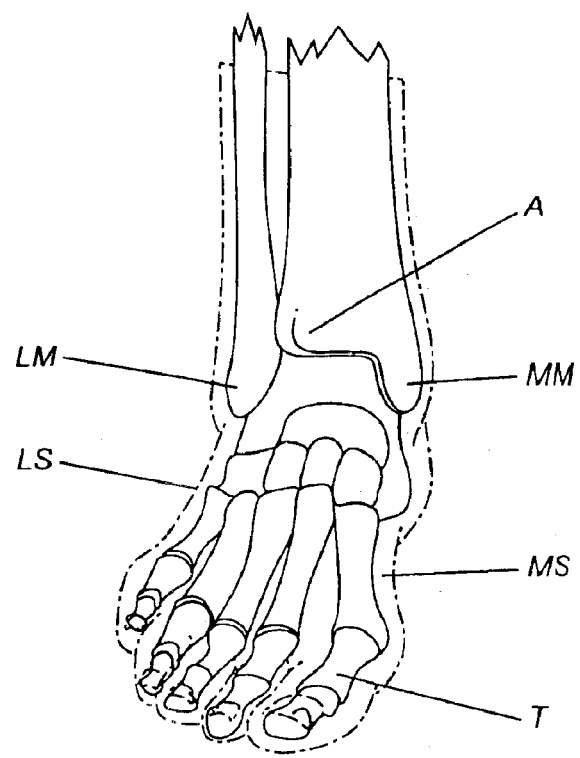
FIG. 15 is a front elevational view of the foot of FIG. 14.

A typical human foot is shown in FIGS. 14 and 15. The human foot has a heel H, an Achilles tendon AT having an upper part UP and a lower part LP that projects outwardly with relation to upper part UP, lower part LP merging with heel H.

The foot also comprises a plantar surface PS, a medial side MS, a lateral side LS, toes T, and an ankle A with a medial malleolus MM and a lateral malleolus LM, lateral malleolus LM being below than medial malleolus MM.

Referring to FIGS. 5 to 10, outer shell 14 is formed of a heel counter 42 receiving heel H, an ankle portion 44 receiving ankle A and medial and lateral quarters 58, 60 receiving medial and lateral sides MS, LS of the foot respectively. Medial and lateral quarters 58, 60 extend forwardly from heel counter 42 and ankle portion 44. Medial quarter 58 comprises inner and outer surfaces 58IS and 58OS and lateral quarter 60 comprises inner and outer surfaces 60IS and 60OS.

Ankle portion 44 comprises an upper part 46 and a lower part 48 that projects outwardly with relation to upper part 46, lower part 48 merging with heel counter 42. Ankle portion 44 is formed for following the rear profile of Achilles tendon AT. More specifically, upper part 46 of ankle portion 44 follows upper part UP of Achilles tendon AT and lower part 48 of ankle portion 44 follows lower part LP of Achilles tendon AT. Heel counter 42 is substantially cup shaped for following the contour of heel H.

Ankle portion 44 also comprises medial and lateral sides 50, 52. Medial side 50 comprises inner and outer surfaces 50IS, 50OS and lateral side 52 comprises inner and outer surfaces 52IS, 52OS. Medial and lateral sides 50, 52 also comprise medial and lateral depressions 54, 56 respectively. Medial depression 54 receives medial malleolus MM and lateral depression 56 receives lateral malleolus LM, lateral depression 56 is located slightly below medial depression 54 for conforming to the morphology of the foot.

Figure 8:
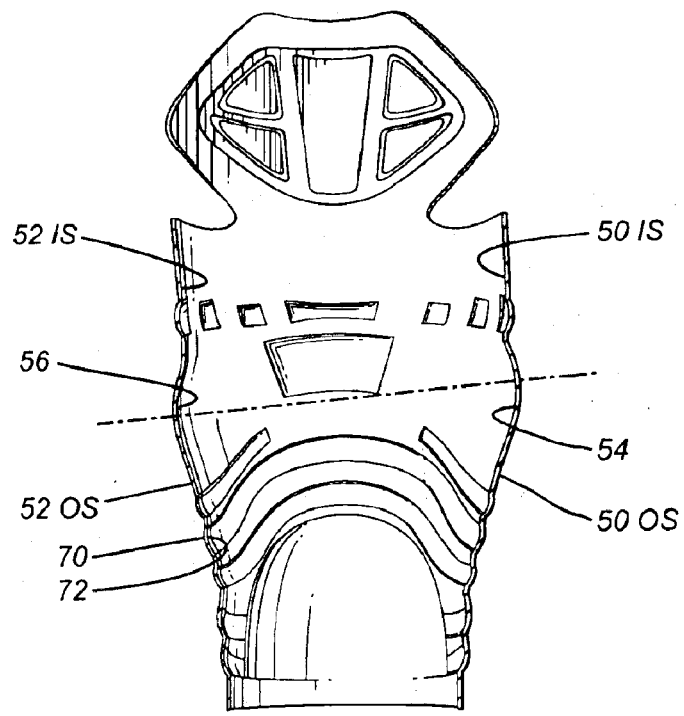
FIG. 8 is a cross-sectional view of the outer shell taken at line 8—8 of FIG. 7.
Figure 9:
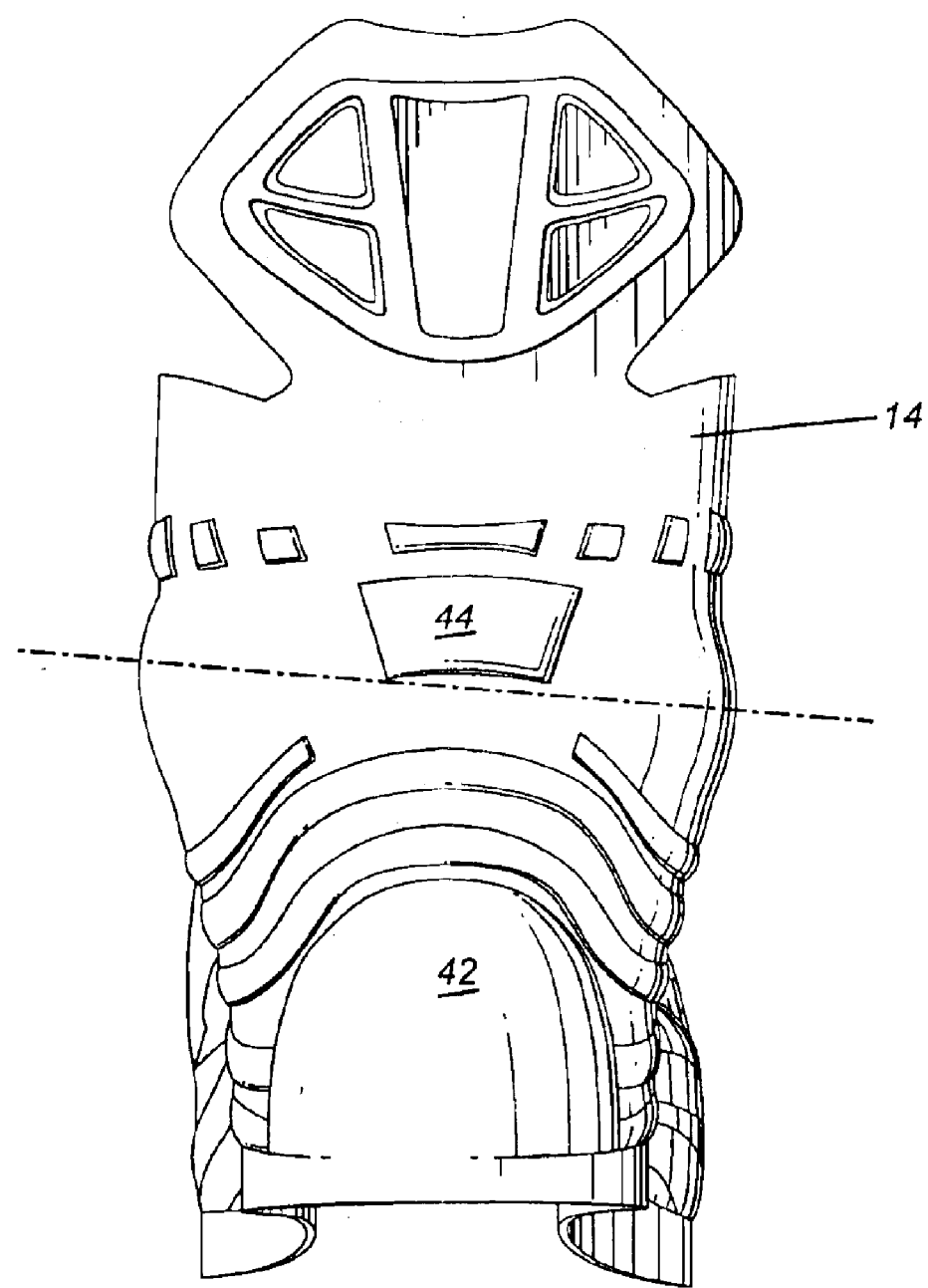
FIG. 9 is a rear elevational view of the outer shell shown in a folded position.
Figure 10:
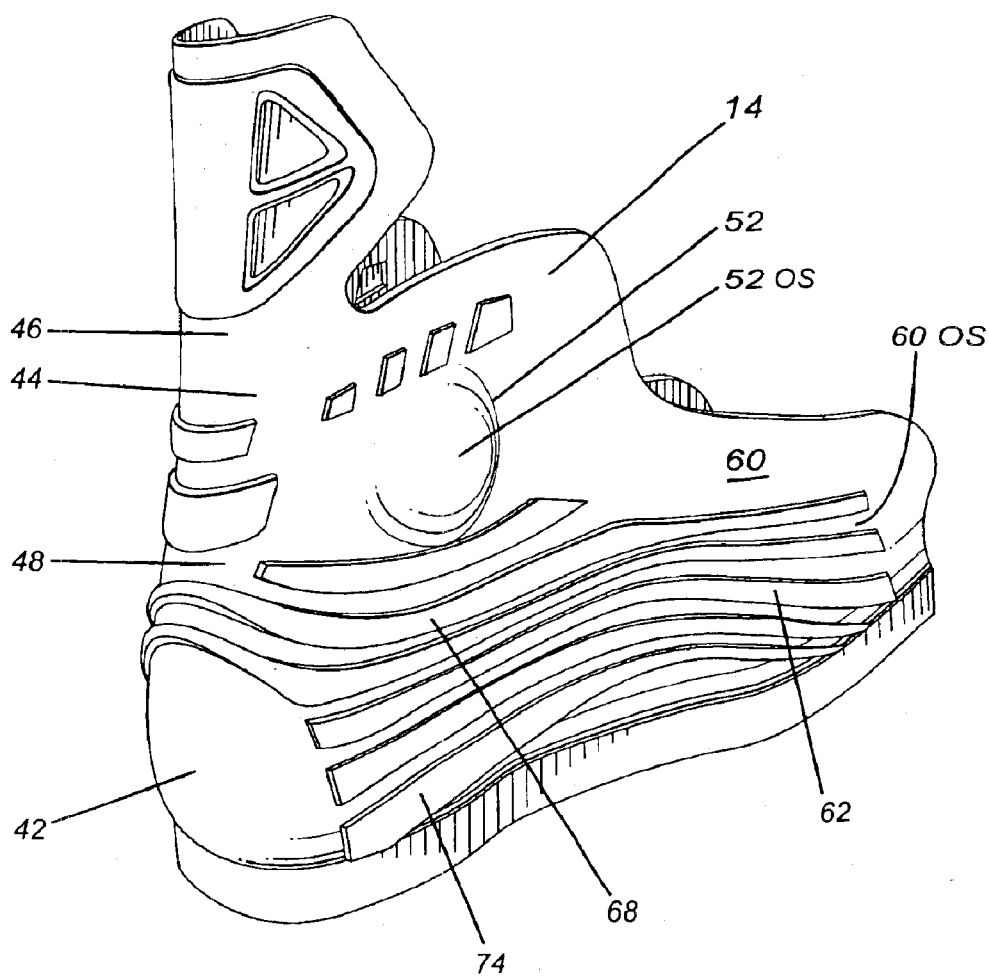
FIG. 10 is a perspective view of the outer shell shown in a folded position.

As shown more particularly in FIGS. 8 and 9, medial and lateral sides 50, 52 of ankle portion 44 and medial and lateral quarters 58, 60 are adapted to conform to the general morphology of the foot. In fact, inner surfaces 50IS, 52IS of ankle portion 44 an inner surfaces 58IS and 60IS of medial and lateral quarters 58, 60 follow the sides of heel H and ankle A, and medial and lateral sides MS, LS of the foot while accounting for statistical variations of the relative position of medial malleolus MM and the lateral malleolus LM.

Medial and lateral quarters 58, 60 comprise quarter reinforcing elements 62 and medial and lateral sides 50, 52 of ankle portion 44 comprise ankle reinforcing elements 68. Referring to FIG. 6, quarter reinforcing element 62 comprises a ridge 64 formed on outer surface 60OS of lateral quarter 60 and a groove 66 registering with ridge 64, groove being formed on inner surface 60IS of lateral quarter 60. Referring to FIG. 8, ankle reinforcing element 68 comprises a ridge 70 formed on outer surface 52OS of lateral side 52 of ankle portion 44 and a groove 72 registering with ridge 70, groove 66 being formed on inner surface 52IS of lateral side 52 of ankle portion.

Outer shell 14 illustrated in FIGS. 5 to 13 comprises quarter reinforcing elements 62 that continue with ankle reinforcing elements 68 for forming continuous elongated reinforcing elements on outer shell 14, these continuous elongated reinforcing elements being also formed on the rear portion of ankle portion 44. Outer shell 14 also comprises heel reinforcing elements 74 that are formed on heel counter 42, heel reinforcing elements 74 being continuous with quarter reinforcing elements 62 for forming continuous elongated reinforcing elements on the sides of outer shell 14.

As reinforcing elements 62 and 68, heel reinforcing elements 74 comprise a ridge formed on the outer surface of heel counter 42 and a groove registering with the ridge, the groove being formed on the interior surface of heel counter 42.

It is understood that quarter and ankle reinforcing elements 62, 68 and quarter and heel reinforcing elements 62, 74 may be separate or formed together and their design may be selected for obtaining the desired rigidity, stability and flexibility of skate boot 10. Reinforcing elements 62, 68 and 74 may or may not have the same width and height (or depth) but their pattern is identical for the following aspect: a ridge (or projection) formed on the outer or inner surface of outer shell 14 corresponds to a groove (or depression) that registers with the ridge, the groove being formed on the outer or inner surface of outer shell 14 (naturally, a ridge formed on the outer surface of outer shell 14 corresponds to a registered groove formed on the inner surface of outer shell 14).

It is also understood that the ridge of reinforcing elements 62, 68 and 74 may be formed on the interior surfaces of medial and lateral quarters 58, 60, ankle portion 44 and heel counter 42 respectively while the registered groove of reinforcing elements 62, 68 and 74 may be formed on the outer surfaces.

Reinforcing elements 62, 68 and 74 also protect the foot from impacts due to a puck, a ball or a stick since these elements tend to dissipate the impact energy.

In order to manufacture outer shell 14, a pre-cut sheet of thermoformable synthetic material is inserted into the cavity of one of the male-female mold shown in FIGS. 1 to 4.

The male and female portions of the molds define the inner and outer surfaces of outer shell 14 respectively. For instance, the male portion of the molds defines inner surfaces 50IS, 52IS of ankle portion 44 and inner surfaces 58IS, 60IS of medial and lateral quarters 58, 60 whereas the female portion of the molds defines outer surfaces 50OS, 52OS of ankle portion 44 an outer surfaces 58OS, 60OS of medial and lateral quarters 58, 60.

Figure 2:
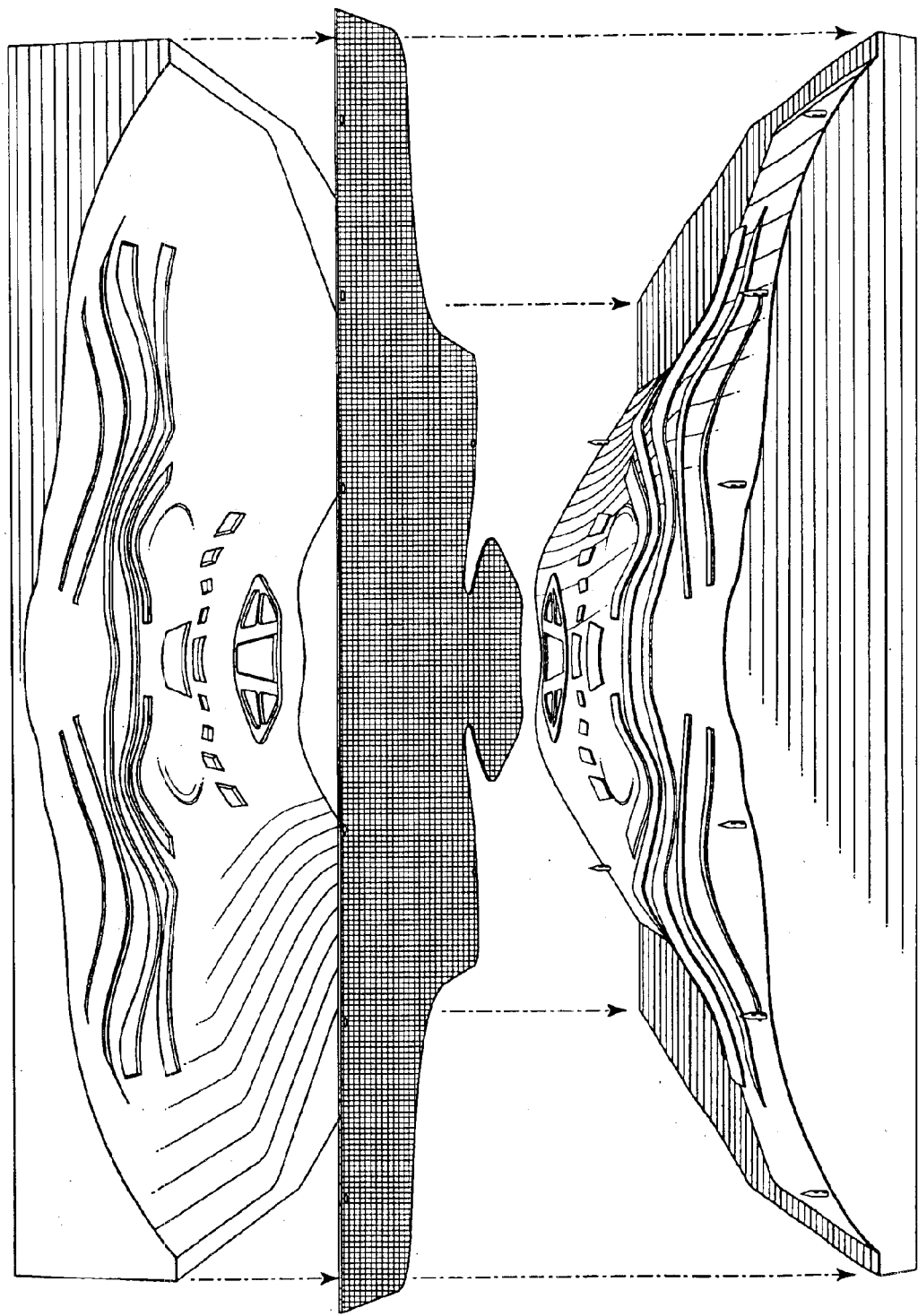
FIG. 2 is a perspective view illustrating a second male-female mold for forming the outer shell.
Figure 3:
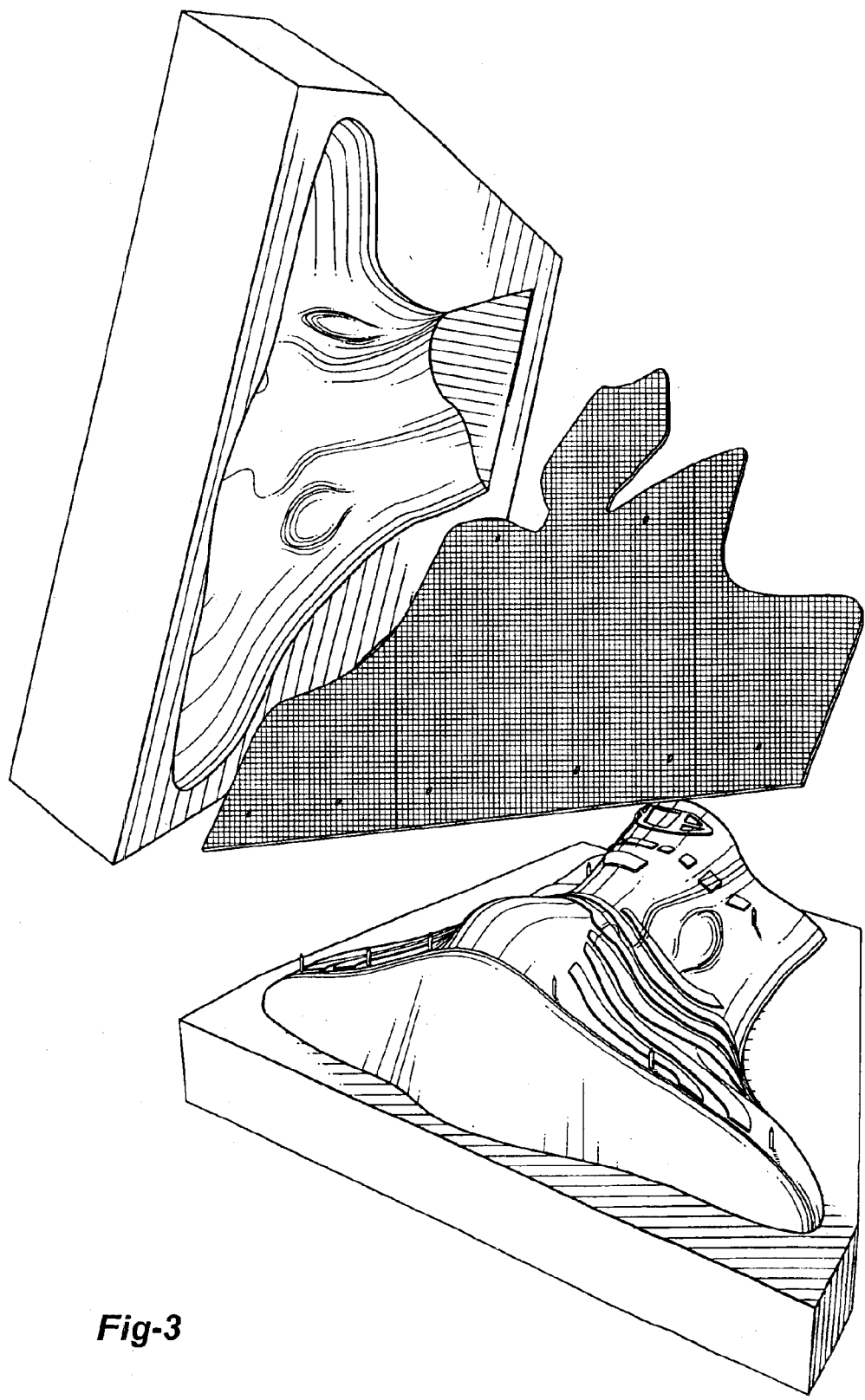
FIG. 3 is a perspective view illustrating a third male-female mold for forming the outer shell.
Figure 4:
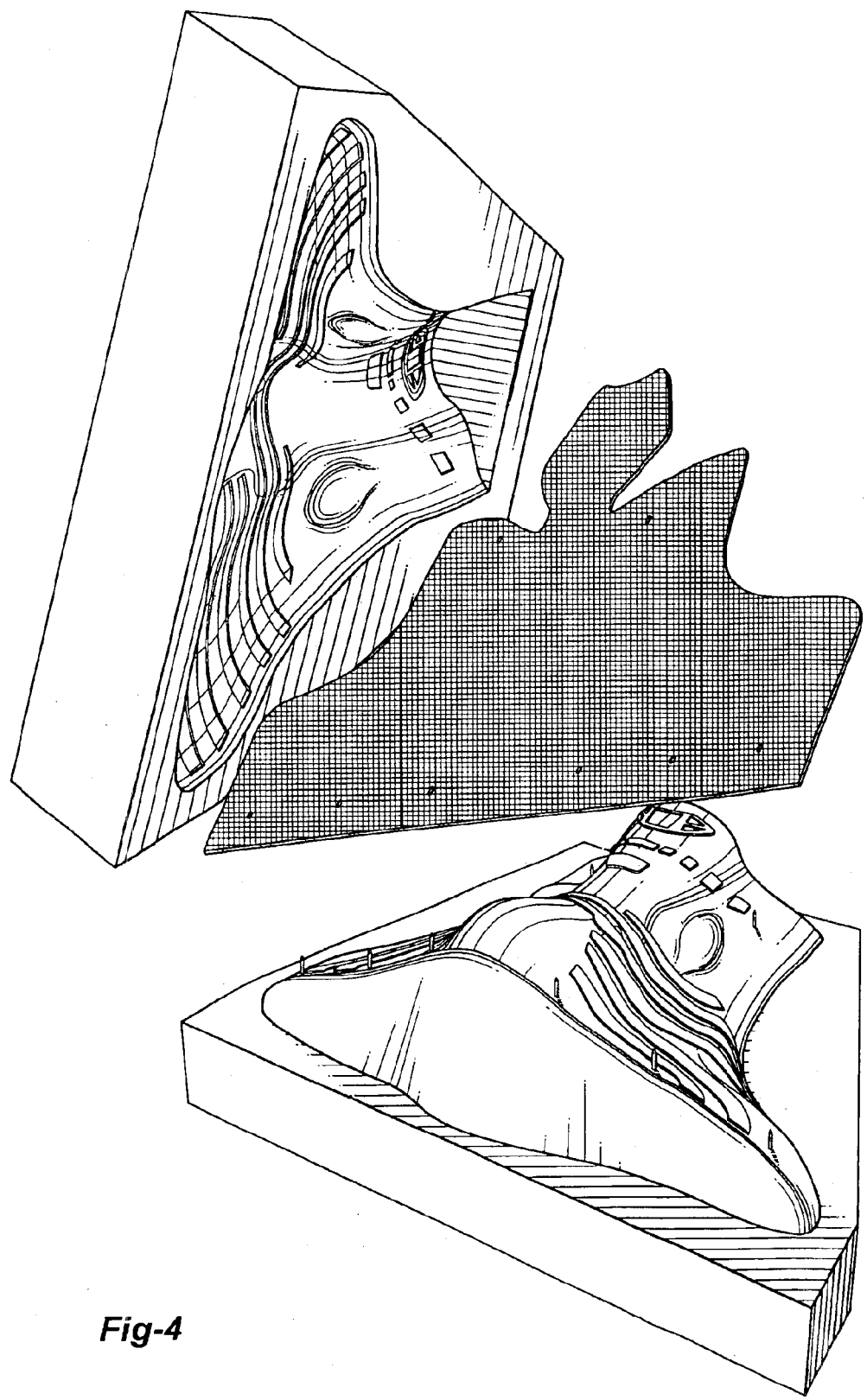
FIG. 4 is a perspective view illustrating a fourth male-female mold for forming the outer shell.
Figure 7:
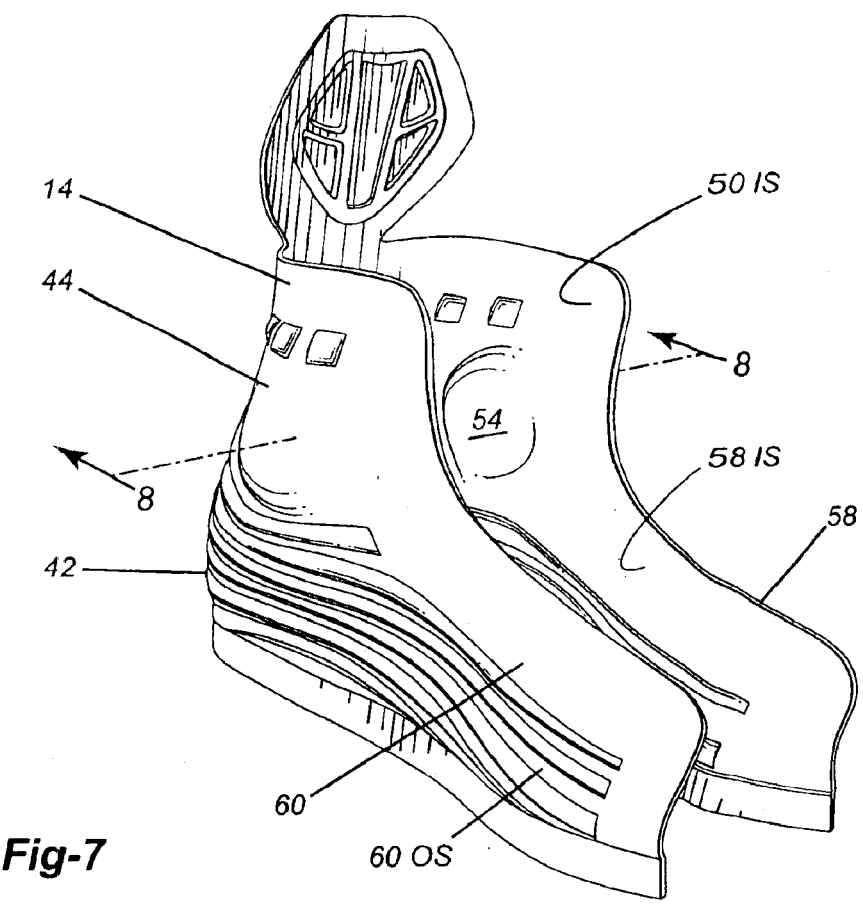
FIG. 7 is a perspective view of the outer shell shown in a folded position.

As seen in FIGS. 2 and 4, grooves and ridges are provided in the female and male portions of the molds while only grooves are provided in the female portion of the molds illustrated in FIGS. 1 and 3. Due to the presence of ridges in the male portions, the deformation of the synthetic material is more important in the region of the reinforcing elements when using the molds illustrated in FIGS. 2 and 4. In general, the deformation of the synthetic material is less important when using the molds illustrated in FIGS. 1 and 2 than the molds illustrated in FIGS. 3 and 4 since the three-dimensional shape of the latter molds is more prominent than the one of the molds illustrated in FIGS. 1 and 2.

The pre-cut sheet is aligned and temporarily secured to one of the mold portions using any suitable means to accurately position the pre-cut sheet within the mold and maintain same in position when the mold is closed. Once the mold is closed over the pre-cut sheet, the mold is heated up to the thermoforming temperature of the pre-cut sheet and male and female portions are pressed against the pre-cut sheet.

As indicated above, the pre-cut sheet of outer shell 14 may be formed of layers of different thermoforming synthetic materials. It is understood that the pre-cut sheet of outer shell 14 can be molded with the pre-cut sheet of inner lining 16, instead of securing inner lining 16 to outer shell 14 after the molding operation of outer shell 14. Naturally, the material of inner lining 16 must be selected from materials that may sustain the thermoforming temperature of outer shell 14.

In a preferred embodiment of the invention, heat and pressure are applied simultaneously for a period of 15 seconds to 2 minutes after which the mold is allowed to cool down so that the pre-cut sheet will set to the three-dimensional shape defined by the male and female portions of the mold. Preferably, heat and pressure are applied simultaneously for a period of 45 seconds to 1 minute. The applied heat is generally between 250° F. and 350° F., with the preferred temperature being approximately 325° F. The applied pressure is generally between 75 psi and 150 psi, with the preferred pressure being approximately 125 psi. It is understood that the amount of time, temperature and pressure may be different if a cooled mold is used.

By utilizing different grades of thermoformable synthetic material, different thermoformable synthetic materials or the same material with different density, the designers are able to vary the mechanical properties of outer shell 14. Similarly, by utilizing different patterns for reinforcing elements 62, 68 and 74 (i.e. location, number, width, height (or depth) and orientation), the designers are able to vary the mechanical properties of outer shell 14. In that sense, using different thermoformable synthetic materials and patterns of reinforcing elements 62, 68 and 74, the designers are thus able to vary the flexibility, rigidity and stability of skate boot 10.

Figure 12:
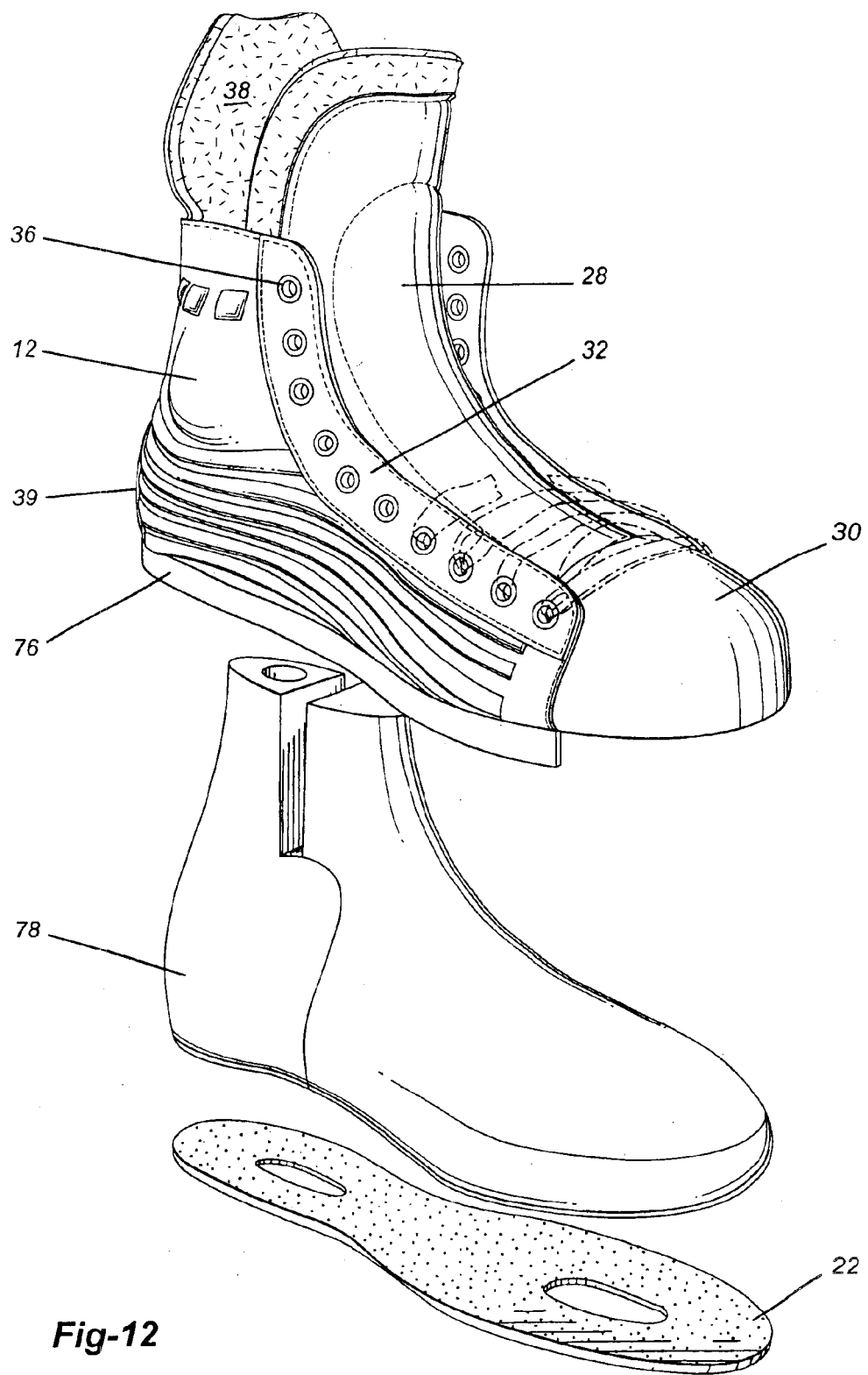
FIG. 12 is a perspective view illustrating the upper constructed in accordance with the invention with a last and an insole.

Referring now to FIG. 12, outer shell 14 also comprises a lower skirt portion 76 that is foldable to overlap a portion of insole 22. A last 78 is inserted into the inside cavity of upper 12. Last 78 enables upper 12 to maintain its shape when skirt portion 76 is folded to give upper 12 its final shape. Last 78 is inserted into upper 12 and insole 22 is positioned underneath last 78 inside skirt portion 76.

Once the assembly is completed, upper 12 is placed upside down into a lasting machine. Glue is first applied to the bottom surface of insole 22 along its periphery. Skirt portion 76 is then folded over last 78 onto the bottom surface of insole 22, using the lasting machine wipers. Once folded, skirt portion 76 is bonded to insole 22 by the glue that was previously laid on the bottom surface of insole 22. Skirt portion 76 is further nailed, stitched, or tacked all around insole 22 to provide the necessary mechanical grip to remove the pulling forces and allow the glue to properly set between skirt portion 76 and insole 22. Once skirt portion 76 is firmly attached to insole 22 and upper 12 has acquired its final shape, a light sanding of the folded skirt portion 76 is performed to partially even the lower surface of upper 12 and provide a flat surface on which outsole 24 can be glued or nailed.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes;

(a) said upper comprising an outer shell and an inner lining mounted inside said outer shell;
   (b) said inner lining comprising a surface facing the heel, the ankle and the medial and lateral sides of the foot; and
   (c) said outer shell being made of a thermoformable synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, said medial and lateral quarters having an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

2. A lasted skate boot as defined in claim 1 wherein said ankle portion comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge, said groove being formed on one of said inner or outer surfaces.

3. A lasted skate boot as defined in claim 1 wherein said heel counter comprises an inner surface and an outer surface, said heel counter further comprising reinforcing elements having a ridge formed on one of said inner or outer surfaces and a groove registering with said ridge, said groove being formed on one of said inner or outer surfaces.

4. A lasted skate boot as defined in claim 1 wherein said ankle portion comprises an upper part and a lower part that projects outwardly with relation to said upper part, said lower part merging with said heel counter, said upper part following the upper part of the Achilles tendon and said lower part following the lower part of the Achilles tendon.

5. A lasted skate boot as defined in claim 1 wherein said ankle portion comprises a lateral depression for receiving the lateral malleolus and a medial depression for receiving the medial malleolus.

6. A lasted skate boot as defined in claim 5 wherein said lateral depression is below said medial depression.

7. A lasted skate boot as defined in claim 1 further comprising an insole facing the plantar surface of the foot and an insole fastener for affixing said insole to said outer shell.

8. A lasted skate boot as defined in claim 7 wherein said outer shell comprises a lower skirt portion foldable to overlap said insole.

9. A lasted skate boot as defined in claim 7 wherein said insole fastener is selected from the group consisting of stitches, glue, nails, adhesives and tacks.

10. A lasted skate boot as defined in claim 1 further comprising a toe box facing the toes of the foot and a toe box fastener for affixing said toe box to said medial and lateral quarters.

11. A lasted skate boot as defined in claim 10 further comprising a tongue extending upwardly and rearwardly from said toe box and an insole facing the plantar surface of the foot.

12. A lasted skate boot as defined in claim 11 wherein said toe box fastener is selected from the group consisting of stitches, glue, nails, adhesives and tacks.

13. A lasted skate boot as defined in claim 1 wherein said upper further comprising a protective overlay, said overlay recovering a portion of said medial and lateral quarters.

14. A lasted skate boot as defined in claim 1 wherein said outer shell is made of a homogenous synthetic material.

15. A lasted skate boot as defined in claim 1 wherein said outer shell comprises an outer layer and an inner layer, said outer layer being more rigid than said inner layer.

16. A lasted skate boot as defined in claim 1 further comprising lacing members disposed in an upper portion of said medial and lateral quarters and a rear cover secured to a rear portion of said outer shell.

17. A lasted skate boot as defined in claim 16 wherein said lacing members are selected from the group consisting of lacing loops and eyelets.

18. An ice skate comprising the lasted skate boot as defined in claim 1.

19. An in-line roller skate comprising the lasted skate boot as defined in claim 1.

20. A thermoformed outer shell for use in an upper of a lasted skate boot having a sole component, said thermoformed outer shell comprising a heel counter receiving the heel of a human foot, an ankle portion receiving the ankle and medial and lateral quarters receiving the medial and lateral sides of the foot respectively, said medial and lateral quarters extending forwardly from said heel counter and said ankle portion, said medial and lateral quarters having an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

21. A thermoformed outer shell as defined in claim 20, wherein said heel counter comprises an inner surface and an outer surface, said heel counter further comprising reinforcing elements having a ridge formed on one of said inner or outer surfaces and a groove registering with said ridge on the other of said inner or outer surfaces.

22. A thermoformed outer shell as defined in claim 20, wherein said ankle portion comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge on the other of said inner or outer surfaces.

23. A thermoformed outer shell as defined in claim 20 wherein said ankle portion comprises a lateral depression for receiving the lateral malleolus and a medial depression for receiving the medial malleolus.

24. A thermoformed outer shell as defined claim 23 wherein said lateral depression is below said medial depression.

25. A thermoformed outer shell as defined in claim 20 wherein said outer shell further comprises a lower skirt portion foldable to overlap the sole component of the lasted skate boot.

26. A thermoformed outer shell as defined in claim 20 wherein said ankle portion comprises an upper part and a lower part that projects outwardly with relation to said upper part, said lower part merging with said heel counter, said upper part following the upper part of the Achilles tendon of the foot and said lower part following the lower part of the Achilles tendon of the foot.

27. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said lasted skate boot comprising an outer shell comprising a layer of thermoformable synthetic material, said outer shell comprising a heel counter receiving the heel of the foot, in ankle portion receiving the ankle and medial and lateral quarters receiving the medial and lateral sides of the foot respectively, said medial and lateral quarters extending forwardly from said heel counter and said ankle portion, said medial and lateral quarters having an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

28. A lasted skate boot as defined in claim 27 wherein said ankle portion comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with maid ridge on the other of said inner or outer surfaces.

29. A lasted skate boot as defined in claim 27 wherein said heel counter comprises an inner surface and an outer surface, said heel counter further comprising reinforcing elements having a ridge formed on one of said inner or outer surfaces and a groove registering with said ridge-on the other one of said inner or outer surfaces.

30. A lasted skate boot as defined in claim 27 wherein said ankle portion comprises an upper part and a lower part that projects outwardly with relation to said upper part, said lower part merging with said heel counter, said upper part following the upper part of the Achilles tendon and said lower part following the lower part of the Achilles tendon.

31. A lasted skate boot as defined in claim 27 further comprising an insole facing the plantar surface of the foot and wherein said outer shell comprises a lower skirt portion foldable to overlap said insole.

32. A lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes;

(a) said upper comprising an outer shell and an inner lining mounted inside said outer shell;

(b) said inner lining comprising a surface facing the heel, the ankle and the medial and lateral sides of the foot; and (c) said outer shell being made of a thermoformable synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein maid ankle portion comprises an upper part and a lower part that projects outwardly with relation to said upper part, said lower part merging with said heel counter, said upper part following the upper part of the Achilles tendon and said lower part following the lower part of the Achilles tendon, and wherein said medial and lateral quarters comprises an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

33. A lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes;

(a) said upper comprising an outer shell and an inner lining mounted inside said outer shell;

(b) said inner lining comprising a surface facing the heel, the ankle and the medial and lateral sides of the foot; and (c) said outer shell being made of a thermoformable synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprises an upper part and a lower part that projects outwardly with relation to said upper part, said lower part merging with said heel counter, said upper part following the upper part of the Achilles tendon and said lower part following the lower part of the Achilles tendon, and wherein said heel counter comprises an inner surface and an outer surface, said heel counter further comprising reinforcing elements having a ridge formed on one of said inner or outer surfaces and a groove registering with said ridge on the other of said inner or outer surfaces.

34. A lasted skate boot comprising an upper for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes;

(a) said upper comprising an outer shell and an inner lining mounted inside said outer shell;

(b) said inner lining comprising a surface facing the heel, the ankle and the medial and lateral sides of the foot; and (c) said outer shell being made of a thermoformable synthetic material and comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprises an upper part and a lower part that projects outwardly with relation to said upper part, said lower part merging with said heel counter, said upper part following the upper part of the Achilles tendon and said lower part following the lower part of the Achilles tendon, and wherein said ankle portion comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge on the other of said inner or outer surfaces.

35. A lasted skate boot as defined in claim 34 wherein said ankle portion comprises a lateral depression for receiving the lateral malleolus and a medial depression for receiving the medial malleolus.

36. A lasted skate boot as defined in claim 35 wherein said lateral depression is below said medial depression.

37. A thermoformed outer shell for use in an upper of a lasted skate boot having a sole component, said thermoformed outer shall comprising a heel counter receiving the heel of a human foot, an ankle portion receiving the ankle and medial and lateral quarters receiving the medial and lateral sides of the foot respectively, said medial and lateral quarters comprising an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces, said ankle portion comprising an upper part and a lower part that projects outwardly with relation to said upper part, said lower part merging with said heel counter, said upper part following the upper part of the Achilles tendon of the foot and said lower part following the lower part of the Achilles tendon of the foot.

38. A thermoformed outer shell for use in an upper of a lasted skate boot having a sole component, said thermoformed cuter shell comprising a heel counter receiving the heel of a human foot, an ankle portion receiving the ankle and medial and lateral quarters receiving the medial and lateral sides of the foot respectively, said ankle portion comprising an upper part and a lower part that projects outwardly with relation to said upper part, said lower part merging with said heel counter, said upper part following the upper part of the Achilles tendon of the foot and said lower part following the lower part of the Achilles tendon of the foot, said ankle portion comprising medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge on the other of said inner or outer surfaces.

39. A thermoformed outer shell as defined in claim 38 wherein said ankle portion comprises a lateral depression for receiving the lateral malleolus and a medial depression for receiving the medial malleolus.

40. A thermoformed outer shell as defined in claim 39 wherein said lateral depression is below said medial depression.

41. A thermoformed outer shell as defined in claim 39 wherein said heel counter comprises an inner surface and an outer surface, said heel counter further comprising reinforcing elements having a ridge formed on one of said inner or outer surfaces and a groove registering with said ridge on the other of said inner or outer surfaces.

42. A thermoformed outer shell as defined in claim 41 wherein said outer shell further comprises a lower skirt portion foldable to overlap the sole component of the lasted skate boot.

43. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising a layer of thermoformable synthetic material, said outer shell comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprises an upper part and a lower part that projects outwardly with relation to said upper part, said lower part merging with said heel counter, said upper part following the upper part of the Achilles tendon and said lower part following the lower part of the Achilles tendon, and wherein said medial and lateral quarters comprises an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

44. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising a layer of thermoformable synthetic material, said outer shell comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprises an upper part and a lower part that projects outwardly with relation to said upper part, said lower part merging with said heel counter, said upper part following the upper part of the Achilles tendon and said lower part following the lower part of the Achilles tendon, and wherein said heel counter comprises an inner surface and an outer surface, said heel counter further comprising reinforcing elements having a ridge formed on one of said inner or outer surfaces and a groove registering with maid ridge on the other of said inner or outer surfaces.

45. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising a layer of thermoformable synthetic material, said outer shell comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, wherein said ankle portion comprise an upper part and a lower part that projects outwardly with relation to said upper part, said lower part merging with said heel counter, said upper part following the upper part of the Achilles tendon and said lower part following the lower part of the Achilles tendon, and wherein said ankle portion comprises medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge on the other of said inner or outer surfaces.

46. A lasted skate boot as defined in claim 45 further comprising an insole facing the plantar surface of the foot and wherein said outer shell comprises a lower skirt portion foldable to overlap said insole.

47. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising:

(a) a heel counter receiving the heel of the foot;

(b) an ankle portion receiving the ankle, said ankle portion comprising an upper part and a lower part that projects outwardly with relation to said upper part, said lower part merging with said heel counter; and (c) medial and lateral quarters receiving the medial and lateral sides of the foot respectively, said medial and lateral quarters extending forwardly from said heel counter and said ankle portion and comprising an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces, and wherein said outer shell is thermoformed in a three dimensional shape such that said heel counter is substantially cup shaped for following the contour of the heel of the foot, said upper part of said ankle portion is shaped for following the upper part of the Achilles tendon and said lower part of said ankle portion is shaped for following the lower part of the Achilles tendon.

48. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising:

(a) a heel counter receiving the heel of the foot, said heel counter comprising an inner surface and an outer surface, said heel counter further comprising reinforcing elements having a ridge formed on one of said inner or outer surfaces and a groove registering with said ridge on the other of said inner or outer surfaces;

(b) an ankle portion receiving the ankle, said ankle portion comprising an upper part and a lower part that projects outwardly with relation to said upper part, said lower part merging with said heel counter; and (c) medial and lateral quarters receiving the medial and lateral sides of the foot respectively, said medial and lateral quarters extending forwardly from said heel counter and said ankle portion, wherein said outer shell is thermoformed in a three dimensional shape such that said heel counter is substantially cup shaped for following the contour of the heel of the foot, said upper part of said ankle portion is shaped for following the upper part of the Achilles tendon and said lower part of said ankle portion is shaped for following the lower part of the Achilles tendon.

49. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said skate boot comprising an outer shell comprising:

(a) a heel counter receiving the heel of the foot;

(b) an ankle portion receiving the ankle, said ankle portion comprising an upper part and a lower part that projects outwardly with relation to said upper part, said lower part merging with said heel counter; said ankle portion comprising medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with maid ridge on the other of said inner or outer surfaces; and (c) medial and lateral quarters receiving the medial and lateral aides of the foot respectively, said medial and lateral quarters extending forwardly from said heel counter and said ankle portion, wherein said outer shell is thermoformed in a three dimensional shape such that said heel counter is substantially cup shaped for following the contour of the heel of the foot, said upper part of said ankle portion is shaped for following the upper part of the Achilles tendon and said lower part of said ankle portion is shaped for following the lower part of the Achilles tendon.

50. A lasted skate boot as defined in claim 49 further comprising an insole facing the plantar surface of the foot and wherein said outer shell comprises a lower skirt portion foldable to overlap said insole.

51. A lasted skate boot for enclosing a human foot, the foot having a heel, an Achilles tendon having an upper part and a lower part that projects outwardly with relation to the upper part, the lower part merging with the heel, the foot also comprising an ankle with a medial malleolus and a lateral malleolus, a plantar surface, medial and lateral sides and toes, said lasted skate boot comprising an outer shell comprising a layer of thermoformable synthetic material, said outer shell comprising a heel counter receiving the heel of the foot, an ankle portion receiving the ankle and medial and lateral quarters receiving the medial and lateral sides of the foot respectively, said medial and lateral quarters extending forwardly from said heel counter and said ankle portion, said ankle portion comprising medial and lateral sides facing the medial malleolus and the lateral malleolus, said medial and lateral sides having an inner surface and an outer surface, at least one of said medial and lateral sides comprising reinforcing elements, each of said reinforcing elements having a ridge formed on one of said inner or outer surfaces and a groove registering with said ridge on the other of said inner or outer surfaces.

52. A lasted skate boot as defined in claim 51, wherein said heel counter comprises an inner surface and an outer surface, said heel counter further comprising reinforcing elements having a ridge formed on one of said inner or outer surfaces and a groove registering with said ridge on the other one of said inner or outer surfaces.

53. A lasted skate boot as defined in claim 51, wherein said medial and lateral quarters comprise an inner surface and an outer surface, at least one of said medial and lateral quarters comprising reinforcing elements, each of said reinforcing elements having a ridge formed on one of said inner or outer surfaces and a groove registering with said ridge on the other of said inner or outer surfaces.

54. A lasted skate boot as defined in claim 51, wherein said outer shell is thermoformed in a three dimensional shape such that said heel counter is substantially cup shaped for following the contour of the heel of the foot, said upper part of said ankle portion is shaped for following the upper part of the Achilles tendon and said lower part of said ankle portion is shaped for following the lower part of the Achilles tendon.

55. A lasted skate boot as defined in claim 54, wherein said outer shell is thermoformed in a three dimensional shape such that said ankle portion comprises a cup-shaped lateral depression for receiving the lateral malleolus and a cup-shaped medial depression for receiving the medial malleolus.

56. A lasted skate boot as defined in claim 55, wherein said cup-shaped lateral depression is below said cup-shaped medial depression.

57. A lasted skate boot as defined in claim 55 further comprising an insole facing the planter surface of the foot.

58. A lasted skate boot as defined in claim 57 wherein said outer shell comprises a lower skirt portion foldable to overlap said insole.

59. An ice skate comprising the lasted skate boot as defined in claim 58.

* * * * *

UNITED STATES PATENT AND TRADEMARK OFFICE
CERTIFICATE OF CORRECTION

PATENT NO. : 6,871,424 B2
DATED : March 29, 2005
INVENTOR(S) : Ivan Labonté et al.

It is certified that error appears in the above-identified patent and that said Letters Patent is hereby corrected as shown below:

Column 8,
Line 45, delete, "said groove being formed",
Line 46, delete "on one" and insert -- on the other --
Line 52, delete, "said groove being";
Line 53, delete "formed on one" and insert -- on the other --

Column 10,
Line 41, delete "maid" and insert -- said --;
Line 47, delete "ridge-on" and insert -- ridge on --

Column 11,
Line 10, delete "maid" and insert -- said --

Column 12,
Line 44, delete "cuter" and insert -- outer --

Column 13,
Line 58, delete "maid" and insert -- said --

Column 15,
Line 30, delete "maid" and insert -- said --

Column 16,
Line 46, delete "planter" and insert -- plantar --

Signed and Sealed this

Fourteenth Day of June, 2005

JON W. DUDAS
*Director of the United States Patent and Trademark Office*